(12) United States Patent
Farmer et al.

(10) Patent No.: US 6,205,763 B1
(45) Date of Patent: Mar. 27, 2001

(54) METHOD OF FORMING A SWIRLER WITH AS-CAST HOLES

(75) Inventors: Gilbert Farmer, Cincinnati, OH (US); James A. Groeschen, Burlington, KY (US); Jason P. Hoppa, Springdale, OH (US); Stanford P. Seto, Loveland, OH (US); Marwan Al-Roub, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/317,243

(22) Filed: May 24, 1999

(51) Int. Cl.[7] .................................................. F02C 13/10
(52) U.S. Cl. ......................................... 60/39.02; 29/888.8
(58) Field of Search .................................. 60/39.02, 748; 29/888, 888.02, 527.3

(56) References Cited

U.S. PATENT DOCUMENTS 5,680,766 * 10/1997 Joshi et al. ............................. 60/746
5,899,075 * 5/1999 Dean et al. ............................. 60/737

* cited by examiner

Primary Examiner—Charles G. Freay
Assistant Examiner—William Rodriguez
(74) Attorney, Agent, or Firm—Andrew C. Hess; Rodney M. Young

(57) ABSTRACT

A method for determining the appropriate hole parameters to achieve the desired airflow in a swirler with as-cast air jet holes includes the steps of determining the desired airflow through the holes and selecting a hole angle for the holes. Next, the ratio of the hole exit area to the hole inlet area is calculated based on the desired airflow and the selected hole angle using a regression equation. Then a value is determined for either of the hole exit area or the hole inlet area, and the other area is calculated from the known ratio. Once the hole angle, hole exit area and hole inlet area have been determined, then a swirler can be cast with as-cast holes using these hole parameters.

10 Claims, 2 Drawing Sheets

METHOD OF FORMING A SWIRLER WITH AS-CAST HOLES

BACKGROUND OF THE INVENTION

This invention relates generally to gas turbine engines and more particularly to swirler arrangements for supplying combustion air to the combustor of such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In combustors used with aircraft engines, the fuel is typically supplied to the combustor through a fuel nozzle positioned at one end of the combustion zone, and air is supplied through a surrounding assembly, known as a swirler, which imparts a swirling motion to the air so as to cause the air and fuel to be thoroughly mixed.

Traditionally, two types of swirlers have been used. One type of swirler includes a plurality of circumferentially-spaced swirl vanes that produce the swirling motion of the air. In the other type, the swirler is provided with a plurality of angularly directed passages, commonly referred to as air jet holes, which cause the desired swirling of the air. The proper sizing of the air jet holes is important because the swirlers are required to provide a certain amount of airflow to achieve the correct fuel-to-air ratio. It is also common to provide swirlers with purge holes for the purpose of avoiding coking on structure adjacent to the swirler.

Conventional swirlers are often made through a process in which a casting of the swirler body is made, and then the air jet holes and any purge holes are formed by either a mechanical drilling and final reaming method or an electro-discharge machining method. While generally providing excellent results, these methods are relatively expensive and time consuming processes that consequently add cost to the manufacture of the swirlers. Accordingly, attempts have been made to produce swirlers as castings with as-cast holes to avoid the cost of these secondary machining processes. However, because the amount of airflow through these holes is affected by a number of hole parameters (i.e., the hole size, the hole angle, the inlet and exit geometry of the hole, and the interior surface finish of the hole), achieving equivalent airflow for an as-cast hole relative to a fully machined and finished hole has proven to be difficult.

Fabricating the necessary casting tooling for as-cast holes requires an iterative process in which a sacrificial swirler is cast with holes that are clearly oversized. These holes are flowchecked and the casting tool is modified to form a smaller hole. These steps are repeated, over and over again with progressively smaller holes, until the desired airflow is achieved. Many iterations are typically required to reach the desired airflow. Thus, developing the tooling for swirlers with as-cast holes is a time consuming and expensive process which must be gone through for every swirler design and every time a swirler design is changed.

Accordingly, there is a need for a method of making swirlers with as-cast holes, particularly determining the proper hole parameters to be used in the casting process, that is free of the above-mentioned problems.

SUMMARY OF THE INVENTION

The above-mentioned needs are met by the present invention which provides a method for determining the appropriate hole parameters to achieve the desired airflow in a swirler with as-cast holes. The method includes the steps of determining the desired airflow through the holes and selecting a hole angle for the holes. Next, the ratio of the hole exit area to the hole inlet area is calculated based on the desired airflow and the selected hole angle using a regression equation. Then a value is determined for either of the hole exit area or the hole inlet area, and the other area is calculated from the known ratio. Once the hole angle, hole exit area and hole inlet area have been determined, then a swirler can be cast with as-cast holes using these hole parameters.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
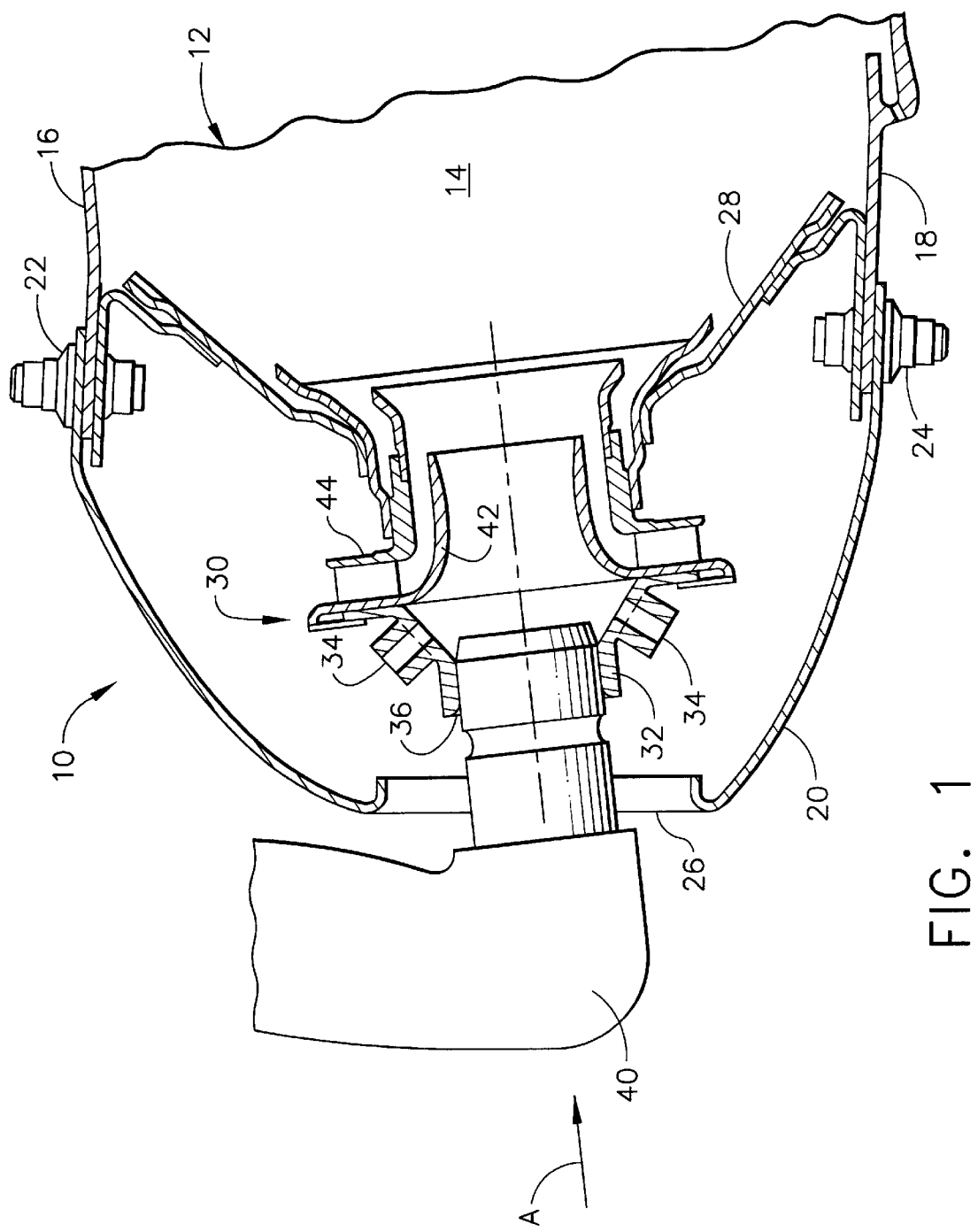
FIG. 1 is an axial sectional view of the forward portion of combustor having a swirler made with the method of the present invention.

Referring to the drawings wherein identical reference numerals denote the same elements throughout the various views, FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by a cowl 20 attached to the outer liner 16 by a first fastener 22 and to the inner liner 18 by a second fastener 24. An opening 26 is formed in the cowl 20 for the introduction of fuel and compressed air. The compressed air is introduced into the combustor 10 from a compressor (not shown) in a direction generally indicated by arrow A of FIG. 1. The compressed air passes primarily through the opening 26 to support combustion and partially into the region surrounding the hollow body 12 where it is used to cool both the liners 16, 18 and turbomachinery further downstream.

Figure 2:
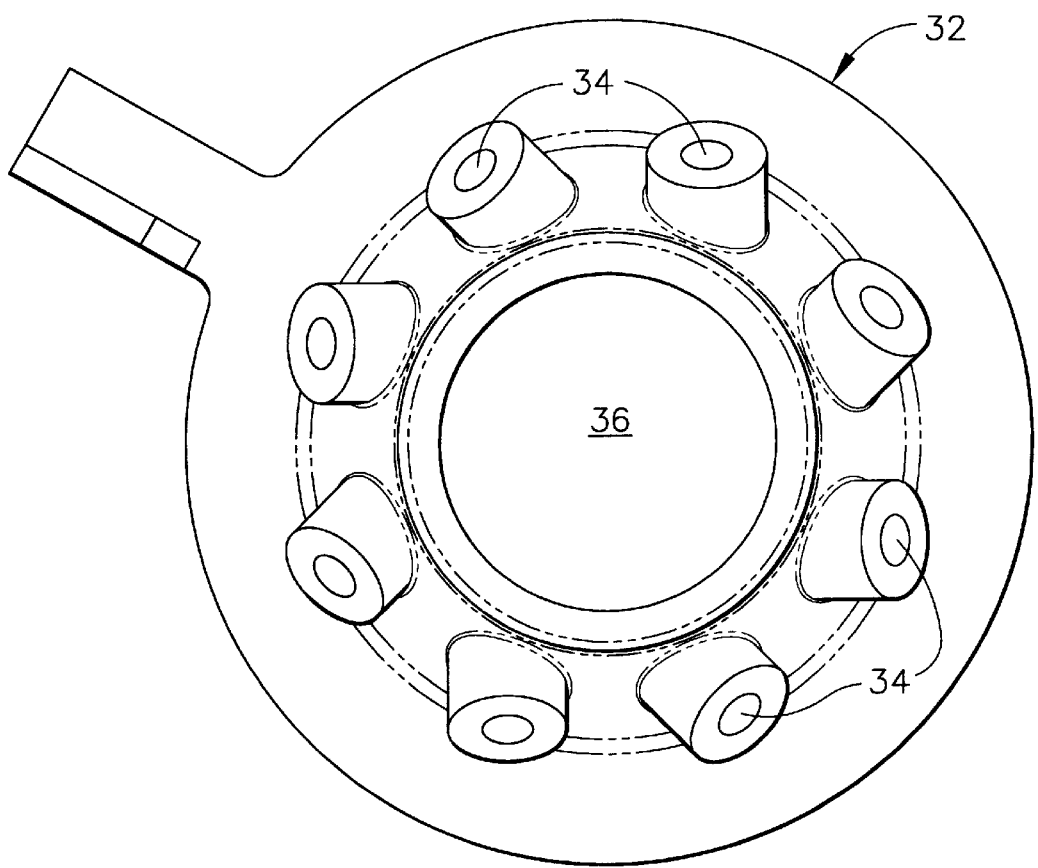
FIG. 2 is a forward-looking-aft end view of a swirler made with the method of the present invention showing the as-cast holes.

Disposed between and interconnecting the outer and inner liners 16, 18 near their upstream ends is an annular dome plate 28. A plurality of circumferentially spaced swirler assemblies 30 (one shown in FIG. 1) is mounted in the dome plate 28. Each swirler assembly 30 includes a primary swirler 32 that comprises a plurality of angularly directed passages or air jet holes 34 (see FIG. 2). The air jet holes 34 (which are as-cast holes made with the method of the present invention) are angled with respect to the axial centerline of the swirler assembly 30 so as to impart a swirling motion to the airflow. Specifically, the longitudinal axes of the air jet holes 34 define an angle with respect to the swirler surface at the hole exit.

The primary swirler 32 also has a central opening 38 that coaxially receives a fuel nozzle 40. A venturi 42 is located downstream of the primary swirler 32, and a secondary swirler 44 is disposed coaxially about the venturi 42. Air from the opening 26 passes through the air jet holes 34. The swirling air exiting the air jet holes 34 interacts with fuel injected from the fuel nozzle 40 so as to mix thoroughly as it passes into the venturi 42. The secondary swirler 44 then acts to present a swirl of air swirling in the opposite direction that interacts with the fuel/air mixture so as to further atomize the mixture and cause it to flow into the combustion chamber 14.

In the present invention, the primary swirler 32 is manufactured with a casting process in which the air jet holes 34 are formed as as-cast holes. The method of the present invention includes first determining the appropriate hole parameters necessary to achieve the desired airflow, and then casting the primary swirler 32 using these predetermined hole parameters. Because as-cast holes typically have a different interior surface finish than mechanically or electro-discharge produced holes, as-cast holes will not produce the same airflow as mechanically or electro-discharge produced holes having the same orientation and geometry. Accordingly, certain other hole parameters that affect airflow (specifically, hole inlet area and hole exit area) must be changed from those of mechanically or electro-discharge produced holes for the as-cast holes to achieve the proper airflow.

The method for determining the appropriate as-cast hole parameters includes first determining the desired overall airflow required for the combustor 10. Overall airflow is a cycle design function, which is dictated by the design of the engine and its desired performance. In other words, the amount of air introduced into the combustor 10 must be in accordance with what is required for the engine to operate as designed. Accordingly, the airflow through the primary swirler 32 is determined by the design and performance requirements of the combustor 10. The airflow through each air jet hole 34 is equal to this airflow divided by the number of air jet holes 34. Typically, a primary swirler has about eight air jet holes, but can have fewer or more such holes depending on the combustor and cycle design details.

Once the swirler airflow is determined, the next step is to select the hole angle, that is, the angle that the longitudinal axis of the air jet hole 34 makes with the surface of the primary swirler 32 at the hole exit. The hole angle is selected based on engineering knowledge of the fuel injection device and its overall location through the swirler. The only requirement in selecting the hole angle is that it needs to be an angle that produces the maximum interaction between the air and the fuel injected from fuel nozzle 40 to promote violent and sustained mixing. Historically, hole angles in the range of about 34° to about 66° degrees have been used to promote thorough mixing.

Now that the desired airflow and hole angle are known, these values are used to calculate the ratio of the cross-sectional area of the hole at its exit (i.e., the hole exit area) to the cross-sectional area of the hole at its inlet (i.e., the hole inlet area). This ratio is calculated using a regression equation that has been derived from data collected from a number of conventionally produced cast-to-size swirlers. The derived regression equation is:

$$F = a - b\left[\frac{A_e}{A_i}\right] + c\theta$$

where F is the airflow through an air jet hole in pounds per hour, $A_e$ is the hole exit area in square inches, $A_i$ is the hole inlet area in square inches, $\theta$ is the hole angle in degrees, a is an empirically derived constant in the range of about 45–50, and preferably about 48.8, b is an empirically derived constant in the range of about 3.5–6.0, and preferably about 4.7, and c is an empirically derived constant in the range of about 3.0–4.0, and preferably about 3.5. The ratio of the hole exit area to the hole inlet area (hereinafter referred to as the "hole area ratio") can be calculated by rearranging the above equation as follows:

$$\left[\frac{A_e}{A_i}\right] = \frac{a + c\theta - F}{b}$$

Once the hole area ratio is known, individual values for the hole exit area and hole inlet area are ascertained by first determining an initial value for either one, and then calculating the other area from the known hole area ratio. For the purposes of this step, it does not matter which area is initially determined. That is, a value for the hole exit area could be determined and the hole inlet area would then be calculated from the hole area ratio, or vice versa. The initial value, for either the exit area or the inlet area, is determined using known engineering design computer codes and historical flow equations coupled with experience-based empirical flow coefficient data.

After this step has been completed, the proper hole angle, hole exit area and hole inlet area are all known. These computed values are then used to cast the primary swirler 32 with as-cast air jet holes 34. The casting step is carried out using otherwise conventional casting techniques. This typically involves using a casting tool that has pins for creating the air jet noles 34. The pins are generally about 2% larger than the determined hole size to account for normal shrinkage. In addition to casting as-cast air jet holes 34, the present invention includes casting as-cast purge holes, if any are included in the primary swirler 32. Although the hole parameters of any purge holes are not determined using the method of the present invention (due to the fact that purge holes are generally not angled and have an insignificant depth-to-diameter ratio), the advantages of as-cast holes can be fully realized only by eliminating all mechanically or electro-discharge machined holes.

Thus, the method of the present invention eliminates the need for costly mechanical or electro-discharge machining while also improving on known processes for casting swirlers with as-cast holes. Specifically, the hole parameters are determined quickly without a lengthy iteration process. The present method also decreases cycle time with respect to mechanically machined and electro-discharge machined swirlers. This is because machining and assembly are often conducted at different shops. Thus, eliminating the machining steps significantly reduces cycle time because the castings do not have to be sent to a separate machining operation prior to assembly.

The foregoing has described a method of making cast-to-size swirlers without using mechanical or electro-discharge machining or a complex iterative process for determining hole parameters. While specific embodiments of the present invention have been described, it will be apparent to those skilled in the art that various modifications thereto can be made without departing from the spirit and scope of the invention as defined in the appended claims.

What is claimed is:

1. A method of determining the appropriate hole parameters for achieving the desired airflow in a swirler with as-cast holes having a hole exit area and a hole inlet area, said method comprising the steps of:

determining a desired airflow through said holes;

selecting a hole angle for said holes;

calculating a ratio of said hole exit area to said hole inlet area based on said desired airflow and said selected hole angle;

determining a value for one of said hole exit area or said hole inlet area;

calculating a value for the other of said hole exit area or said hole inlet area from said calculated ratio and said determined value.

2. The method of claim 1 wherein said ratio of said hole exit area to said hole inlet area is determined with the equation:

$$\left[\frac{A_e}{A_i}\right] = \frac{a + c\theta - F}{b}$$

where $A_e$ is said hole exit area, $A_i$ is said hole inlet area, $\theta$ is said selected hole angle, F is said desired airflow, a is an empirically derived constant in the range of about 45–50, b is an empirically derived constant in the range of about 3.5–6.0, and c is an empirically derived constant in the range of about 3.0–4.0.

3. The method of claim 2 wherein the constant a is about 48.8, the constant b is about 4.7, and the constant c is about 3.5.

4. The method of claim 1 wherein said step of determining a desired airflow through said holes is based on engine design factors.

5. The method of claim 1 wherein said step of selecting a hole angle comprises selecting a hole angle in a range of about 34° to about 64°.

6. A method of forming a swirler with as-cast holes having a hole exit area and a hole inlet area, said method comprising the steps of:

determining a desired airflow through said holes;

selecting a hole angle for said holes;

calculating a ratio of said hole exit area to said hole inlet area based on said desired airflow and said selected hole angle;

determining a value for one of said hole exit area or said hole inlet area;

calculating a value for the other of said hole exit area or said hole inlet area from said calculated ratio and said determined value; and casting said swirler based on said selected hole angle, said determined value and said calculated value.

7. The method of claim 6 wherein said ratio of said hole exit area to said hole inlet area is determined with the equation:

$$\left[\frac{A_e}{A_i}\right] = \frac{a + c\theta - F}{b}$$

where $A_e$ is said hole exit area, $A_i$ is said hole inlet area, $\theta$ is said selected hole angle, F is said desired airflow, a is an empirically derived constant in the range of about 45–50, b is an empirically derived constant in the range of about 3.5–6.0, and c is an empirically derived constant in the range of about 3.0–4.0.

8. The method of claim 7 wherein the constant a is about 48.8, the constant b is about 4.7, and the constant c is about 3.5.

9. The method of claim 6 wherein said step of determining a desired airflow through said holes is based on engine design factors.

10. The method of claim 6 wherein said step of selecting a hole angle comprises selecting a hole angle in a range of about 34° to about 64°.

* * * * *